US012270528B1

(12) United States Patent
Hwang

(10) Patent No.: US 12,270,528 B1
(45) Date of Patent: Apr. 8, 2025

(54) OUTDOOR LIGHT HAVING GROUND INSERT STORAGE STRUCTURE

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/780,906

(22) Filed: Jul. 23, 2024

(51) Int. Cl.
*F21S 9/03* (2006.01)
*F21S 8/08* (2006.01)
*F21V 17/00* (2006.01)
*F21V 21/08* (2006.01)

(52) U.S. Cl.
CPC ............ *F21V 17/007* (2013.01); *F21S 8/081* (2013.01); *F21S 9/037* (2013.01); *F21V 21/0824* (2013.01)

(58) Field of Classification Search
CPC .... F21V 17/007; F21V 21/0824; F21S 9/037; F21S 8/081
See application file for complete search history.

(56) References Cited

U.S. PATENT DOCUMENTS

| 10,240,734 | B1 | 3/2019 | Hwang | |
| 11,698,181 | B1* | 7/2023 | Hwang | F21S 8/081 |
| | | | | 362/186 |
| 12,078,318 | B1* | 9/2024 | Hwang | F21V 31/005 |
| 2004/0156189 | A1* | 8/2004 | Opolka | F21V 21/0824 |
| | | | | 362/153.1 |
| 2022/0136668 | A1* | 5/2022 | Ko | F21S 9/037 |
| | | | | 362/191 |

\* cited by examiner

*Primary Examiner* — Julie A Bannan
(74) *Attorney, Agent, or Firm* — BACON & THOMAS, PLLC

(57) ABSTRACT

An outdoor light having a ground insert storage structure is disclosed. The outdoor light includes a hollow column and a ground insert. The hollow column has a transverse partition therein and a recess portion below the transverse partition. When in use, a positioning post of the ground insert is inserted upward, the ground insert is held in position by the transverse partition, and a spike of the ground insert is inserted into the ground. When not in use, the ground insert is reversed, the spike is inserted through the transverse partition and stored in the hollow column, and the positioning post is hidden in the recess portion.

5 Claims, 4 Drawing Sheets

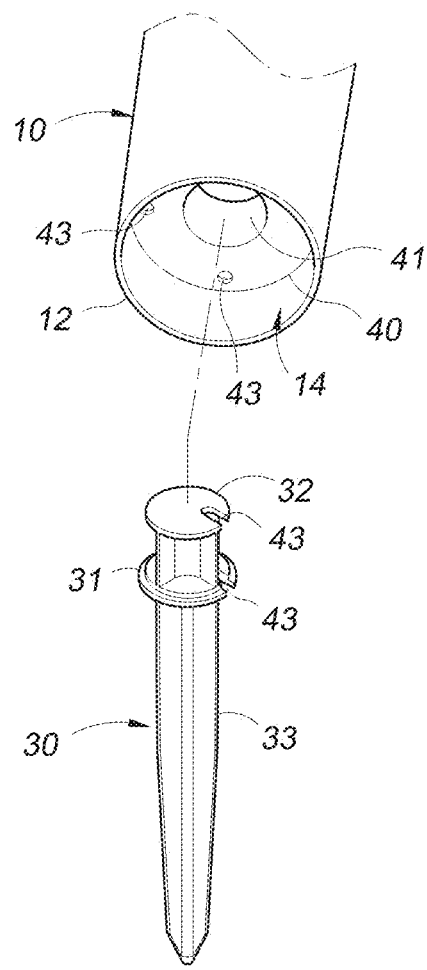
FIG.3
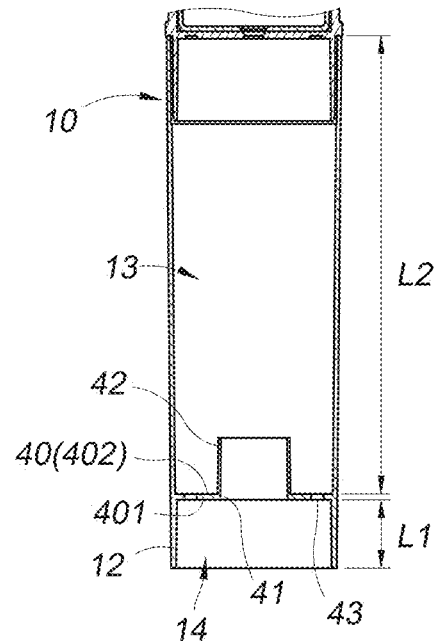
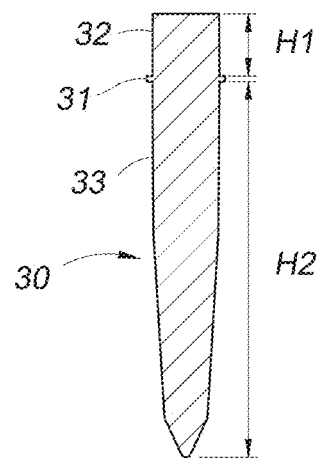
FIG.4

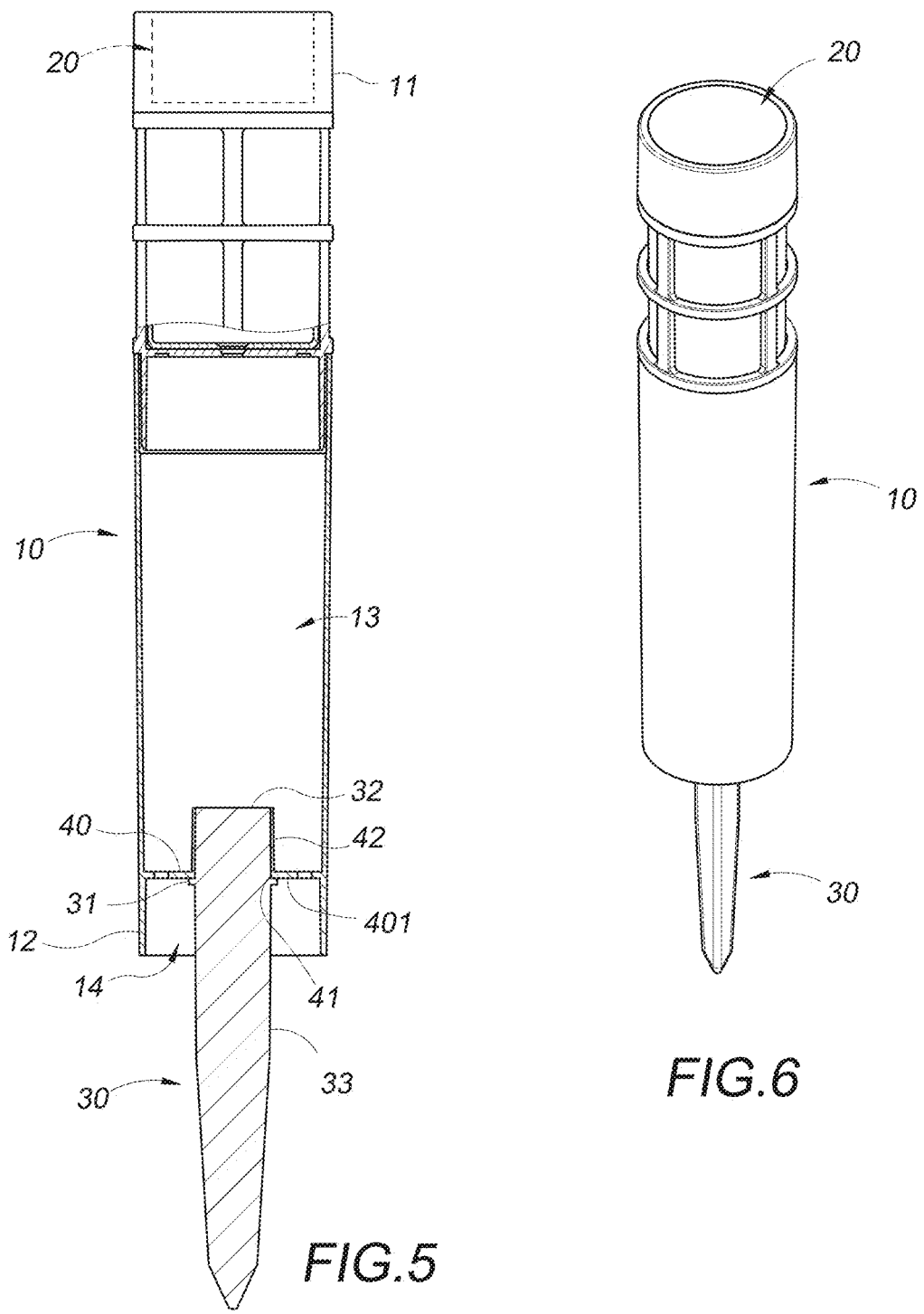

OUTDOOR LIGHT HAVING GROUND INSERT STORAGE STRUCTURE

BACKGROUND OF THE INVENTION

1. Field of the Invention

The present invention relates to an outdoor light, and more particularly to an outdoor light having a hollow column and a ground insert. The ground insert of the outdoor light can be fully stored in the hollow column when not in use, reducing the volume and cost of packaging and transportation.

2. Description of the Related Art

Garden lights are often used in gardens, homes, open-air restaurants or outdoor leisure places, etc. to provide moderate lighting, and to create atmosphere and decoration for the surrounding environment. To take into account the convenience of installation and maintenance, most of the existing garden lights are equipped with solar panels and batteries and use solar energy as the power supply for operation to achieve the advantages of environmental protection and energy saving.

There are various outdoor lights on the market. The inventor has developed a variety of outdoor lights, as disclosed in U.S. Pat. No. 11,698,181B1, U.S. Pat. No. 10,240,734B1, etc. The basic structure is as shown in FIG. 1 and FIG. 2, comprising a hollow column 1, a solar lighting module 2 on the top of the hollow column 1, and a ground insert 3 detachably connected to the bottom of the hollow column 1.

As to the assembly structure of the hollow column 1 and the ground insert 3, a mounting hole 5 is formed in the center of a bottom plate 4 of the hollow column 1, and a positioning post 6 that can be inserted into the mounting hole 5 is provided above the ground insert 3, and a retaining ring 7 having an outer diameter greater than the inner diameter of the mounting hole 5 is provided below the positioning post 6. When in use, the ground insert 3 is held in place by the retaining ring 7 against the bottom plate 4, and a spike 8 of the ground insert 3 is inserted into the outdoor ground, so that the outdoor light is secured to the ground and the solar lighting module 2 emits light.

Because of packaging and transportation considerations, this outdoor light will be sold with the ground insert 3 stored in the hollow column 1. That is, the spike 8 is inserted upward into the mounting hole 5 and stored in the hollow column 1 to reduce the packaging volume. However, due to the design that the outer diameter of the retaining ring 7 must be greater than the inner diameter of the mounting hole 5, the positioning post 6 extends out of the bottom surface of the bottom plate 4 of the hollow column 1, which is not conducive to packaging and transportation. If the positioning post of the ground insert can be hidden in the hollow column, it will reduce the transportation volume and transportation cost.

SUMMARY OF THE INVENTION

The primary objective of the present invention is to provide an outdoor light having a ground insert storage structure. The outdoor light comprises a hollow column. The hollow column has a top end, a bottom end, and an accommodation space between the top end and the bottom end. A solar lighting module is provided on the top end for providing illumination. A ground insert is detachably connected to the accommodation space.

A transverse partition is provided in the accommodation space of the hollow column. The transverse partition has a top surface, a bottom surface, and a mounting hole passing through the top surface and the bottom surface. A distance is defined between the bottom surface of the transverse partition and the bottom end of the hollow column to form a recess portion.

The ground insert includes a retaining ring having an outer diameter greater than an inner diameter of the mounting hole, a positioning post located above the retaining ring, and a spike located below the retaining ring. The positioning post has a length less than or equal to the distance of the recess portion. The spike has a length greater than the distance of the recess portion and less than or equal to a distance between the top surface of the transverse partition and the top end of the hollow column.

When in use, the positioning post of the ground insert is inserted upward to pass through the mounting hole, the ground insert is held in position by the retaining ring against the bottom surface of the transverse partition, and the spike extends downward out of the bottom end of the hollow column to be inserted into the ground.

When not in use, the ground insert is reversed, the spike is inserted upward into the mounting hole and held in position by the retaining ring against the bottom surface of the transverse partition, such that the spike is hidden and stored in the accommodation space between the top surface of the transverse partition and the top end, and the positioning post is hidden and stored in the recess portion.

Compared with the prior art, in the present invention, the bottom end of the hollow column is formed with the recess portion. When the ground insert is stored, the positioning post is hidden and stored in the recess portion, thus reducing the packaging volume, which is beneficial for reducing the volume and cost of transportation.

Embodiments of the present invention will now be described, by way of example only, with reference to the accompanying drawings.

BRIEF DESCRIPTION OF THE DRAWINGS

FIG. 3 is a partial exploded view of the present invention;

FIG. 4 is a partial exploded cross-sectional view of the present invention;

FIG. 5 is a partial assembled cross-sectional view of the present invention;

FIG. 6 is a perspective view of the present invention;

DETAILED DESCRIPTION OF THE PREFERRED EMBODIMENTS

Figures 1, 2:
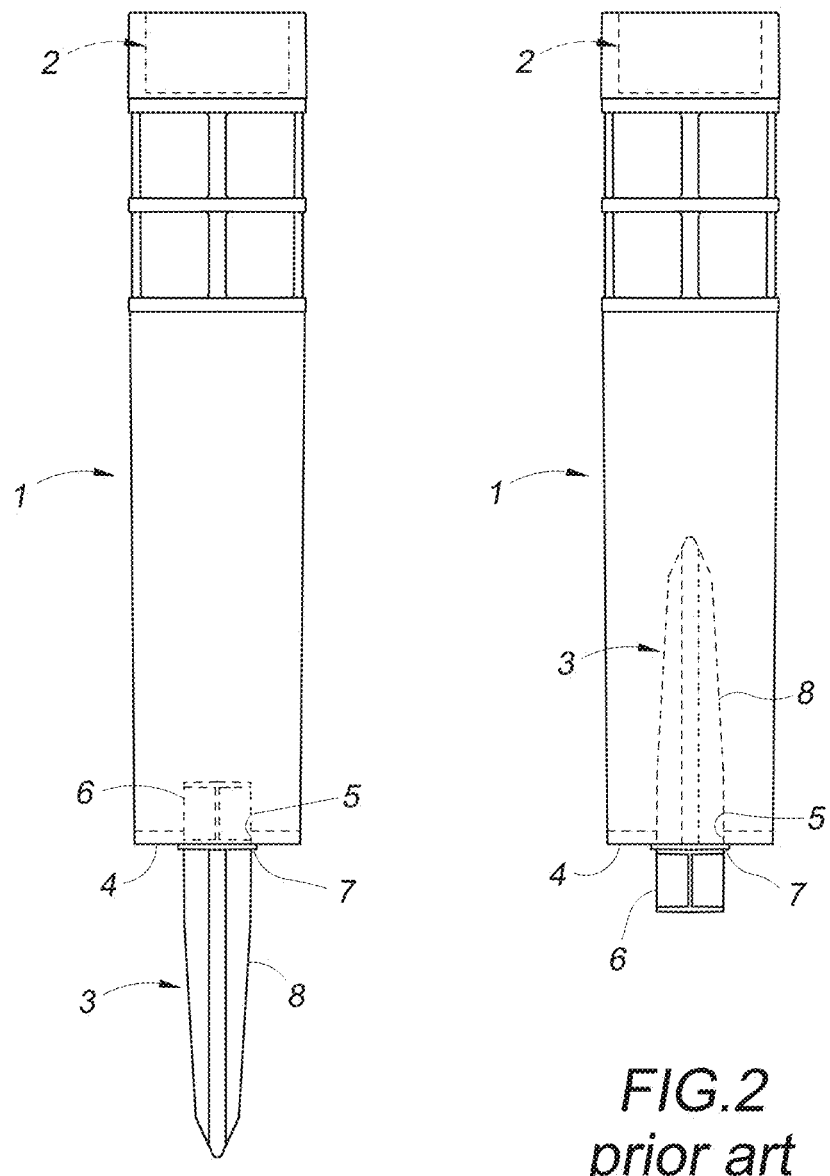
FIG. 1 is a schematic view of a conventional outdoor light when in use.
FIG. 2 is a schematic view of the conventional outdoor light, wherein the spike of the ground insert is stored in the hollow column.

As shown in FIG. 3 through FIG. 5, the present invention discloses an outdoor light having a ground insert storage structure. The outdoor light comprises a hollow column 10. The hollow column 10 has a top end 11, a bottom end 12, and an accommodation space 13 between the top end 11 and the bottom end 12. A solar lighting module 20 is provided on the top end 11 for providing illumination. A ground insert 30 is detachably connected to the accommodation space 13.

A transverse partition 40 is provided in the accommodation space 13 of the hollow column 10. The transverse partition 40 has a bottom surface 401, a top surface 402, and a mounting hole 41 passing through the bottom surface 401 and the top surface 402. A distance L1 is defined between the bottom surface 401 of the transverse partition 40 and the bottom end 12 of the hollow column 10 to form a recess portion 14.

The ground insert 30 includes a retaining ring 31 having an outer diameter greater than an inner diameter of the mounting hole 41, a positioning post 32 located above the retaining ring 31, and a spike 33 located below the retaining ring 31. The length H1 of the positioning post 32 is less than or equal to the distance L1 of the recess portion 14. The length H2 of the spike 33 is greater than the distance L1 of the recess portion 14 and less than or equal to a distance L2 between the top surface 402 of the transverse partition 40 and the top end 11 of the hollow column 10.

As shown in FIG. 4 through FIG. 6, when in use, after the positioning post 32 of the ground insert 30 is inserted upward to pass through the mounting hole 41, the ground insert 30 is held in position by the retaining ring 31 against the bottom surface 401 of the transverse partition 40. At this time, because the length H2 of the spike 33 is greater than the distance L1 of the recess portion 14, the spike 33 extends downward out of the bottom end 12 of the hollow column 10, such that the spike 33 can be inserted and secured into the ground. The solar lighting module 20 emits light to provide illumination.

Figure 7:
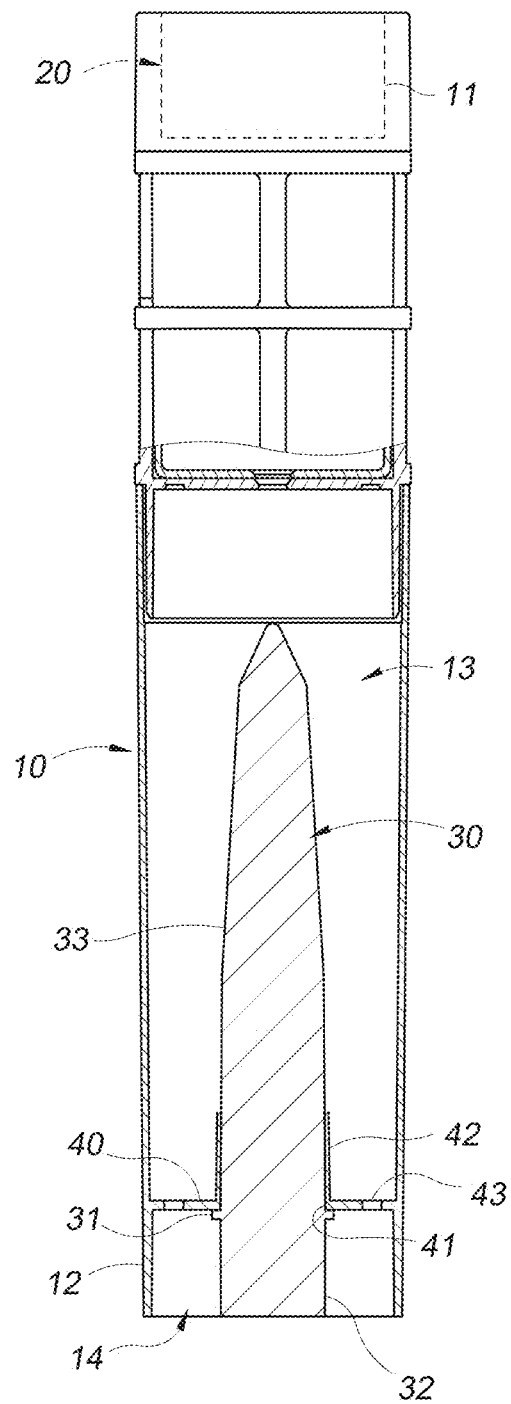
FIG. 7 is a schematic view of the present invention, wherein the ground insert is fully stored in the hollow column.

As shown in FIG. 4 and FIG. 7, when the outdoor light is to be packaged and transported, or when the user wants to store the outdoor light, the ground insert 30 is reversed, and the spike 33 is inserted upward into the mounting hole 41 and held in position by the retaining ring 31 against the bottom surface 401 of the transverse partition 40. At this time, because the length H2 of the spike 33 is less than or equal to the distance L2 between the top surface 402 of the transverse partition 40 and the top end 11 of the hollow column 10, the spike 33 is hidden and stored in the accommodation space 13 between the top surface 402 of the transverse partition 40 and the top end 11. In addition, because the length H1 of the positioning post 32 is less than or equal to the distance L1 of the recess portion 14, the positioning post 32 is fully hidden and stored in the recess portion 14, thus reducing the packaging volume, which is beneficial for reducing the volume and cost of transportation.

Considering the stability of the outdoor light fixed on the outdoor ground, the transverse partition 40 may further have a sleeve 42 extending upward from the top surface 402 and surrounding the mounting hole 41. The sleeve 42 is configured for holding the positioning post 32 or the spike 33. The positioning post 32 or the spike 33 is held in position by the sleeve 42 in a tight fit manner to prevent the ground insert 30 from shaking.

Of course, the ground inert 30 may be positioned to the mounting hole 41 in other ways, such as screwing, buckling and so on. Alternatively, the outer periphery of the positioning post 32 or the spike 33 of the ground insert 30 and the inner periphery of the mounting hole 41 are held and positioned in a tight fit manner.

Furthermore, in order to avoid the accumulation of water inside the accommodation space 13 of the hollow column 10, which may affect the operation of electronic components such as the solar lighting module 20, the positioning post 32 and/or the transverse partition 40 has a perforation 43. The perforation 43 communicates with the recess portion 14 and the accommodation space 13 for drainage of the accommodation space 13.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An outdoor light having a ground insert storage structure, the outdoor light comprising a hollow column, the hollow column having a top end, a bottom end, and an accommodation space between the top end and the bottom end, a solar lighting module being provided on the top end for providing illumination, a ground insert being detachably connected to the accommodation space, characterized in that:

a transverse partition is provided in the accommodation space of the hollow column, the transverse partition has a top surface, a bottom surface, and a mounting hole passing through the top surface and the bottom surface, a distance is defined between the bottom surface of the transverse partition and the bottom end of the hollow column to form a recess portion;

the ground insert includes a retaining ring having an outer diameter greater than an inner diameter of the mounting hole, a positioning post located above the retaining ring, and a spike located below the retaining ring, the positioning post has a length less than or equal to the distance of the recess portion, the spike has a length greater than the distance of the recess portion and less than or equal to a distance between the top surface of the transverse partition and the top end of the hollow column;

wherein when in use, the positioning post of the ground insert is inserted upward to pass through the mounting hole, the ground insert is held in position by the retaining ring against the bottom surface of the transverse partition, and the spike extends downward out of the bottom end of the hollow column to be inserted into the ground;

wherein when not in use, the ground insert is reversed, the spike is inserted upward into the mounting hole and held in position by the retaining ring against the bottom surface of the transverse partition, such that the spike is hidden and stored in the accommodation space between the top surface of the transverse partition and the top end, and the positioning post is hidden and stored in the recess portion.

2. The outdoor light as claimed in claim 1, wherein the positioning post or the spike of the ground insert is held in the mounting hole in a tight fit manner.

3. The outdoor light as claimed in claim 1, wherein the transverse partition further has a sleeve extending upward from the top surface and surrounding the mounting hole for holding the positioning post or the spike.

4. The outdoor light as claimed in claim 3, wherein the positioning post or the spike of the ground insert is held in position by the sleeve in a tight fit manner.

5. The outdoor light as claimed in claim 1, wherein the positioning post and/or the transverse partition has a perforation communicating with the recess portion and the accommodation space.

* * * * *